(12) United States Patent
Dietrich et al.

(10) Patent No.: US 7,938,358 B2
(45) Date of Patent: May 10, 2011

(54) ROADABLE AIRCRAFT WITH FOLDING WINGS AND INTEGRATED BUMPERS AND LIGHTING

(75) Inventors: Carl Curtis Dietrich, Somerville, MA (US); Samuel Adam Schweighart, Watertown, MA (US); Anna Marie Mracek, Somerville, MA (US)

(73) Assignee: Terrafugia, Inc., Somerville, MA (US)

( * ) Notice: Subject to any disclaimer, the term of this patent is extended or adjusted under 35 U.S.C. 154(b) by 1100 days.

(21) Appl. No.: 11/650,346

(22) Filed: Jan. 5, 2007

(65) Prior Publication Data

US 2010/0230532 A1  Sep. 16, 2010

Related U.S. Application Data

(60) Provisional application No. 60/756,719, filed on Jan. 6, 2006, provisional application No. 60/756,720, filed on Jan. 6, 2006, provisional application No. 60/756,721, filed on Jan. 6, 2006, provisional application No. 60/756,722, filed on Jan. 6, 2006, provisional application No. 60/832,552, filed on Jul. 21, 2006.

(51) Int. Cl.
    *B64C 37/00* (2006.01)
(52) U.S. Cl. .............................. 244/2; 244/49
(58) Field of Classification Search ................. 244/2, 49
    See application file for complete search history.

(56) References Cited

U.S. PATENT DOCUMENTS

| | | | |
|---|---|---|---|
| 1,286,679 A | 12/1918 | Longobardi |
| 1,756,463 A | 3/1928 | Jezek |
| 1,731,757 A | 10/1929 | Tubbe |
| 1,816,653 A | 7/1931 | Nelsch |
| 1,998,148 A | 4/1935 | Vieriu |
| D106,939 S | 11/1937 | Waterman |
| 2,135,073 A | 11/1938 | Gerhart |
| 2,215,003 A | 9/1940 | Johnson |
| 2,241,577 A | 5/1941 | Beals, Jr. |
| 2,338,751 A | 1/1944 | Zuck |
| 2,373,467 A | 4/1945 | Frakes |
| 2,402,468 A | 6/1946 | Thompson |
| 2,410,234 A | 10/1946 | Read |
| D155,569 S | 6/1947 | Bailey |
| 2,424,769 A | 7/1947 | Page |
| 2,427,936 A | 9/1947 | Wales, Jr. |
| 2,430,869 A | 11/1947 | Fulton, Jr. |
| 2,434,068 A | 1/1948 | Geisse |
| 2,446,528 A | 8/1948 | Clark |
| 2,462,462 A | 2/1949 | Boggs et al. |
| D153,331 S | 4/1949 | Zuck |
| 2,494,547 A | 1/1950 | Fish, Jr. |

(Continued)

OTHER PUBLICATIONS

International Search Report and Written Opinion of the International Searching Authority for PCT/US2007/000256, dated Apr. 7, 2008.

(Continued)

*Primary Examiner* — Galen Barefoot
(74) *Attorney, Agent, or Firm* — Goodwin Procter LLP

(57) ABSTRACT

A low-wing, low-span canard aircraft with a protected pusher-style propeller is designed to transition simply between use in the air and use on the ground, without any mechanical effort on the part of the pilot. The vehicle may include deformable aerodynamic bumpers, embedded road-safety vehicle lighting and license plates, a protected propeller, and an integrated RFID airport access system. The vehicle may be designed for potential certification by the Federal Aviation Administration as a Light Sport Aircraft.

38 Claims, 8 Drawing Sheets

U.S. PATENT DOCUMENTS

| | | | |
|---|---|---|---|
| 2,539,489 | A | 1/1951 | Smith |
| 2,544,021 | A | 3/1951 | Holland |
| 2,562,490 | A | 7/1951 | Hall |
| 2,563,731 | A | 8/1951 | Masterson |
| 2,573,271 | A | 10/1951 | Peril |
| 2,593,785 | A | 4/1952 | Nye et al. |
| 2,609,167 | A | 9/1952 | Gero |
| 2,624,530 | A | 1/1953 | Hanssen |
| 2,666,602 | A | 1/1954 | Holland |
| 2,674,422 | A | 4/1954 | Pellarini |
| 2,675,976 | A | 4/1954 | Gerardine |
| 2,681,773 | A | 6/1954 | Rethorst |
| 2,692,095 | A | 10/1954 | Carpenter |
| 2,713,465 | A | 7/1955 | Novinger |
| 2,767,939 | A | 10/1956 | Taylor |
| 2,770,427 | A | 11/1956 | Schreffler |
| 2,811,323 | A | 10/1957 | Rethorst |
| 2,893,661 | A | 7/1959 | Aylor |
| 2,923,494 | A | 2/1960 | Strong |
| 2,923,681 | A | 5/1960 | Palermo |
| 2,940,688 | A | 6/1960 | Bland |
| 2,945,646 | A | 7/1960 | Sturgeon |
| 3,012,737 | A | 12/1961 | Dodd |
| 3,029,042 | A | 4/1962 | Martin |
| 3,056,654 | A | 10/1962 | Zuck |
| 3,065,927 | A | 11/1962 | Mills |
| 3,083,936 | A | 4/1963 | Rethorst |
| 3,090,581 | A | 5/1963 | Einarsson |
| 3,134,560 | A | 5/1964 | Halsmer |
| 3,261,572 | A | 7/1966 | Gorton |
| 3,265,326 | A | 8/1966 | Postelson |
| 3,317,161 | A | 5/1967 | Sawyer |
| 3,371,886 | A | 3/1968 | Schertz |
| 3,481,559 | A | 12/1969 | Apostolescu |
| 3,612,440 | A | 10/1971 | Strong |
| 3,645,474 | A | 2/1972 | Arbuse |
| 3,931,942 | A * | 1/1976 | Alpert .................. 244/2 |
| 3,960,103 | A * | 6/1976 | Rey ..................... 244/2 |
| 4,022,403 | A | 5/1977 | Chiquet |
| 4,240,601 | A * | 12/1980 | Reed .................. 244/49 |
| 4,269,374 | A | 5/1981 | Miller |
| 4,358,072 | A | 11/1982 | Williamson |
| 4,579,297 | A | 4/1986 | Ayoola |
| 4,627,585 | A | 12/1986 | Einstein |
| 4,856,732 | A | 8/1989 | Eickmann |
| 4,865,275 | A * | 9/1989 | Thompson ............ 244/2 |
| 4,881,701 | A | 11/1989 | Bullard |
| 4,899,954 | A | 2/1990 | Pruszenski, Jr. |
| 4,913,375 | A | 4/1990 | Fitzpatrick |
| 4,986,493 | A | 1/1991 | Sarh |
| 5,050,817 | A | 9/1991 | Miller |
| 5,115,996 | A | 5/1992 | Moller |
| 5,141,173 | A | 8/1992 | Lay |
| D331,893 | S | 12/1992 | Szakacs |
| 5,201,478 | A | 4/1993 | Wooley |
| 5,356,094 | A * | 10/1994 | Sylvain ................ 244/49 |
| 5,836,541 | A | 11/1998 | Pham |
| 5,984,228 | A | 11/1999 | Pham |
| 6,082,665 | A | 7/2000 | Spitzer |
| 6,086,014 | A | 7/2000 | Bragg, Jr. |
| 6,129,306 | A | 10/2000 | Pham |
| 6,131,848 | A | 10/2000 | Crow |
| 6,224,012 | B1 | 5/2001 | Wooley |
| 6,619,584 | B1 | 9/2003 | Haynes |
| 6,786,450 | B1 | 9/2004 | Einstein |
| 2003/0094536 | A1 | 5/2003 | LaBiche |

OTHER PUBLICATIONS

Communication Relating to the Results of the Partial International Search for PCT/US2007/000256, dated Oct. 2, 2007.

* cited by examiner

ROADABLE AIRCRAFT WITH FOLDING WINGS AND INTEGRATED BUMPERS AND LIGHTING

CROSS-REFERENCE TO RELATED APPLICATIONS

This application claims priority to and the benefit of U.S. provisional patent application Ser. Nos. 60/756,719, 60/756,720, 60/756,721, and 60/756,722 filed Jan. 6, 2006, the disclosures of which are being incorporated herein by reference in their entirety. This application also claims priority to and the benefit of U.S. provisional patent application Ser. No. 60/832,552, filed Jul. 21, 2006, the disclosure of which is being incorporated herein by reference in its entirety.

FIELD OF THE INVENTION

The present invention relates generally to the field of roadable aircraft, and more particularly to a type of aircraft that can be converted into an automotive type vehicle capable of driving on the road, sometimes popularly referred to as a "flying car" or "flying-driving vehicle".

BACKGROUND OF THE INVENTION

Henry Ford once stated, "Mark my word: A combination airplane and motorcar is coming. You may smile. But it will come . . . " (Henry Ford, Chairman, Ford Motor Company-1940). In fact, shortly after the Wright brothers' first flight, people have been looking for ways to combine aircraft and automobiles into one vehicle. In 1918, Felix Longobardi was issued the first patent (U.S. Pat. No. 1,286,679) for a multi-use vehicle also known as a roadable aircraft. Throughout the following 88 years, there have been numerous patents issued for vehicle concepts that are capable of both flying and driving. While there has been no shortage of inventions in this field, there have been no concepts which have met with commercial success.

In fact, the closest any of the prior art appears to have come to commercial viability is the invention of Moulton B. Taylor, U.S. Pat. No. 2,767,939 (the '939 patent). Five prototypes of the "Aerocar" described in that patent were built, and most of them successfully drove and flew. The Aerocar design was certified by the Civil Aeronautics Administration (CAA), the precursor to today's Federal Aviation Administration (FAA). However, the Aerocar was limited in its practicality for most pilots, not only because of compromised performance, but also because of the requirement for the pilot to physically get out of the vehicle and fold the wings of the vehicle into a trailer that was towed behind the car portion of the vehicle. This additional labor was unattractive to the pilot/customer, both because of the added workload and because some pilots were not comfortable detaching and attaching the wings to the aircraft.

The reasons for the lack of commercial success for the numerous previous roadable aircraft patents are as varied as the patents themselves. Some failed because the design was infeasible or unsafe. Others failed because the design was too complicated or too expensive to manufacturer, while most did not satisfy the customer's need. Regardless of the specific reason, to this day no design appears to have been practical enough to become a commercial success.

This is not too surprising when one considers the difference between an aircraft and automobile that must be reconciled for such a combination vehicle to be practical. One difference is the aircraft's wings. For flight, an aircraft requires long, high-aspect ratio wings. The high aspect ratio allows for increased efficiency and performance. In order for the vehicle to drive on the road, the wings must be dealt with. Most roadable aircraft can be classified by how they deal with the wings and tail of the vehicle when in driving mode. These classes are: VTOL (vertical take-off and landing), modular, and integrated.

VTOL aircraft typically either have very short wings or no wings at all. The idea is that if one is tired of being stuck in traffic, one could push a button, take off straight up and fly over the traffic jam. However, VTOL aircraft are much more akin to helicopters than the 'hovercraft' envisioned as flying cars. As with helicopters, VTOL vehicles generate lift by either helicopter-like blades or ducted fans which force a large amount of air downwards. This downwash will generally kick up a lot of dirt and rocks. The debris would be thrown into the neighboring cars and pedestrians thus making the idea of taking off in the middle of traffic infeasible. As a result, VTOL aircraft are generally restricted to taking off from a helipad or remote area away from persons and property.

An example VTOL aircraft is described in U.S. Pat. No. 5,115,996 (the "Mollar Skycar™). This vehicle has four ducted fans located at each end of the vehicle that rotate to provide the necessary lift. Once airborne, the ducted fans rotate to provide the necessary forward thrust. VTOL aircraft, while being able to takeoff and land like a helicopter, also inherit all the complexity, cost and disadvantages of helicopters. Because of the complexity, number of parts, and stability issues, VTOL aircraft are inherently complex and expensive to develop, build and maintain.

Modular aircraft typically look like traditional aircraft when the vehicle is configured for flight. When configured for driving, the vehicle's wings (and usually the tail section) are removed from the aircraft. This creates two problems. First, the vehicle's operator must manually remove the wings for driving and reattach the wings for flight. Some vehicles allow for a single operator to perform the function, while others require multiple persons. Regardless of the design, many operators do not feel comfortable in their own skills to attach the wings safely to the aircraft. Also, when the wings and tail are removed, the question becomes one of what to do with them. If the wings are left at the airport, then the operator must return to that same airport in order to fly. This defeats the freedom of having a roadable aircraft. Some modular aircraft solve this problem by allowing the wings to be towed behind the vehicle. The '939 patent is an example of a modular aircraft where the wings and tail are towed behind the vehicle.

Integrated aircraft keep the wings attached to the vehicle at all times. Typically the wings are folded, either mechanically or manually, alongside or in the body of the vehicle. An integrated vehicle with mechanically operated wings allows for the operator of the vehicle to convert from aircraft mode to automobile mode at the 'touch of a button'. This may add a considerable amount of practicality to the vehicle.

Besides the wings, another aspect of an aircraft that is not directly compatible with an automobile is the propeller. The propeller is the most sensitive part of the aircraft to nicks and dents. Because of this, pilots are trained to run their hand over the propeller before each flight to check for damage. When driving down the road, rocks and other debris are often kicked up by traffic. In modular designs, the propeller is typically part of the structure that is removed in order to convert the vehicle into an automobile. Therefore, modular designs typically do not have to worry about the propeller when the vehicle is configured for driving. For integrated designs, the propeller is either removed, such as in U.S. Pat. No. 2,430, 869, left attached to front of the vehicle (such as in the "Fusion" vehicle by Steve Nichols), or left attached to the rear of the vehicle. Some vehicles, which leave the propeller attached to the rear of the fuselage, allow the propeller to hang below the vehicle where it is still susceptible to road debris (such as in U.S. Pat. No. 3,371,886). In order to be practical, the propeller should be protected from road debris at all times, without the need for the operator to manually remove the propeller.

An aspect of an automobile that is not directly compatible with an aircraft is the fact that the back of an automobile is typically a blunt surface. The reason for this includes the need for a rear bumper, indicator lights (such as turn signals) and identification devices (such as license plates). Aircraft, on the other hand, have sharp trailing edges to reduce the aerodynamic drag while in flight. Having a blunt surface, such as that on the back of an automobile, would produce a substantial amount of drag on the vehicle when in the air. This extra drag is at least inefficient and may be unacceptable. Modular designs with removable tail structures can hide the rear bumper and lights within the structure of the tail. However, integrated designs must deal with this problem. The prior art vehicles do not appear to address this issue. Either the vehicle has an automotive style aft end and takes the penalty in increased drag, or the vehicle has an aircraft aft end and does not address the need for bumpers or automotive lighting.

Finally, automobiles are typically designed to be strong and sturdy in order to survive the harsh environment of the road including potholes, bumps, curbs and other typical road hazards. This causes automobiles to be heavier than aircraft, which only have to deal with runways that are usually well paved. Fortunately, material technology is available now that allows for strong reliable structure at a fraction of the weight of previous automotive structures.

As such, while a number of roadable aircraft designs have been contemplated or produced, these designs have in general been impractical for use as general purpose driving and flying vehicles capable of meeting road and air vehicle safety standards.

SUMMARY OF THE INVENTION

One aspect of the invention described herein includes a vehicle capable of flying and driving throughout the extent of both the existing airport and airspace infrastructure and surface roads, including city streets and highways. In one embodiment, the vehicle is designed for use by pilots and for operation with potential certification from the Federal Aviation Administration (FAA) as a Light Sport Airplane (LSA), and can feature at least one of an integrated design in which the two main wings can fold automatically at the pilot's command, a protected pusher-style propeller, integrated aerodynamic bumper surfaces on the canard and rear elevator, embedded lights and license plates, a vehicle-based RFID system to facilitate airport access, and combinations thereof.

On aspect of the invention includes a flying and driving vehicle. This vehicle can include a fuselage, and a main wing mounted to the fuselage and oriented substantially symmetrically about a central elongate axis of the vehicle. The main wing can be deployable between a folded configuration and an unfolded configuration, with a folding mechanism configured to deploy the main wing between the folded configuration and the unfolded configuration. The vehicle can further include a secondary wing located in front of the main wing and configured to provide horizontal stabilization of the vehicle when in flight, at least one first aerodynamic control surface configured to provide longitudinal stability and control primarily about a yaw axis of the vehicle when in flight, and a second aerodynamic control surface configured to provide stability and control primarily about a pitch axis of the vehicle when in flight. The vehicle can further include a plurality of wheels configured to support the vehicle when on the ground, wherein at least one of the plurality of wheels is located aft of a center of mass of the vehicle, and at least one of the plurality of wheels is located in front of the center of mass of the vehicle. The vehicle can also include a first propulsion mechanism configured to provide a means of moving the vehicle on the ground, wherein the first propulsion mechanism comprises a torque applied to at least one of the plurality of wheels, a second propulsion mechanism configured to provide a means for propelling the vehicle when in flight, wherein the second propulsion mechanism comprises a means of accelerating an airflow in a rearward direction, and a substantially horizontal surface located underneath the second propulsion mechanism to provide protection from road debris for the second propulsion mechanism when driving.

In one embodiment of the invention, at least a portion of the main wing is oriented substantially vertically with respect to the ground when in the folded configuration. In one embodiment, the main wing can include at least two folding sections on each side of the central elongate axis of the vehicle. The main wing can also include at least one aileron control surface to enable control of the vehicle primarily about a roll axis of the vehicle when in flight.

In one embodiment, the second aerodynamic control surface is located on the secondary wing. The second control surface can be adapted to produce a downward force on the vehicle when driving.

In one embodiment, the secondary wing is located at a front end of the fuselage. In one embodiment, the secondary wing can be adapted to provide front impact collision protection while the vehicle is on the ground.

The horizontal surface can be an extension of the main wing. In one embodiment, the second control surface can be located on the horizontal surface. The second control surface can be adapted to provide rear impact collision protection while the vehicle is on the ground. In one embodiment, the second control surface can be adapted to produce a downward force on the vehicle when driving.

In one embodiment, the second aerodynamic control surface is adapted to provide at least one automotive indicator or identification element. In one embodiment, the second control surface can be located on both the secondary wing and the horizontal surface.

In one embodiment, the second propulsion mechanism can include at least one propeller. The at least one propeller can be located at an aft portion of the fuselage. In an alternative embodiment, the second propulsion mechanism can include at least one jet engine, rocket, or other appropriate propulsion source.

In one embodiment, the vehicle can include at least one substantially vertical stabilizer mounted to the fuselage. In one embodiment, the vehicle can include two substantially vertical stabilizers mounted to the fuselage on either side of the second propulsion mechanism. These stabilizers can be adapted to provide protection for the second propulsion mechanism from road debris during driving and reduce propulsive noise during flying. The at least one first aerodynamic control surface can be mounted to the at least one stabilizer. The first aerodynamic control surface can be adapted to provide at least one automotive indicator or identification element.

One aspect of the invention can include an aerodynamic element for a flying and driving vehicle. This aerodynamic element can include an aerodynamic surface and at least one automotive indicator element.

In one embodiment of the invention, the at least one automotive indicator element can be embedded within the aerodynamic surface. In one embodiment, an outer surface of the at least one automotive indicator element can be substantially flush with the aerodynamic surface of the aerodynamic element.

In one embodiment, the at least one automotive indicator element can include an illumination element. The illumination element can include at least one of a head light, a turn indicator light, a brake light, a tail light, a running light, a reverse light, a license plate illumination light, and combinations thereof.

In one embodiment, the at least one automotive indicator element can include an identification element in addition to, or in place of, the illumination element. The identification element can include at least one of a license plate, a registration number, a name plate, and combinations thereof.

In one embodiment, the aerodynamic element can further include at least one pivot connection adapted to pivot the aerodynamic element relative to the vehicle when attached thereto. The pivot connection can be adapted to pivot the aerodynamic element between a configuration associated with a flight mode and a configuration associated with an automotive mode of the vehicle.

One aspect of the invention can include an aerodynamic element for a flying and driving vehicle. This aerodynamic element can include an aerodynamic surface and an impact protection element. The impact protection element can be adapted to provide protection to the aerodynamic element during a low-speed impact.

In one embodiment, the aerodynamic surface can include at least one of a substantially horizontal lifting surface and a movable rear control surface. The aerodynamic element can be adapted to allow visual determination of an impact overload via structural deformity. In one embodiment, the aerodynamic element can further include an internal structural support.

In one embodiment, the impact protection element can include an energy absorbing material coupled to the structural support. The aerodynamic element can further include a deformable covering over at least a portion of the structural support and the energy absorbing material. The deformable covering can be adapted to return to its original shape after being deformed by a low-speed impact.

Another aspect of the invention can include an aerodynamic element for a flying and driving vehicle including an aerodynamic surface, at least one automotive indicator element, and an impact protection element, wherein the impact protection element is adapted to provide protection to the aerodynamic element during a low-speed impact.

One aspect of the invention can include a radio frequency identification system for a flying and driving vehicle. This system can include a first radio frequency identification device associated with a flying and driving vehicle, and a second radio frequency identification device associated with an airport vehicle access zone, wherein the radio frequency identification devices are adapted to communicate identification information therebetween.

Another aspect of the invention can include a method of allowing a flying and driving vehicle access to and egress from an airport having a vehicle access zone. The method can include the steps of communicating identification information between a radio frequency identification device associated with a flying and driving vehicle and a radio frequency identification device associated with the vehicle access zone, determining whether at least one of access and egress are permitted, and allowing passage of the vehicle through the vehicle access zone if permitted.

In one embodiment, the communicating step can include vehicle identification information. The identification information can include at least one of a name, an address, a nationality, a vehicle registration number, a pilot license number, an automobile license number, a membership number, a security code, a credit card number, and combinations thereof.

In one embodiment, the vehicle identification information is stored by the vehicle access zone radio frequency identification device. In one embodiment, the method can further include the step of transmitting the vehicle identification information to a remote location. In one embodiment, the method can further include the step of removing the vehicle radio frequency identification device from the vehicle.

In one embodiment, the vehicle radio frequency identification device can be adapted for use independently of the vehicle to permit personal access to and egress from the airport. In one embodiment, the method can further include the step of inputting information into the vehicle radio frequency identification device. The input step can include use of at least one of a key pad, a touch sensitive pad, a mouse pad, a roller ball, a switch, a button, a dial, a wireless connection, and combinations thereof. In one embodiment, the method can further include the step of at least one of activating and deactivating the vehicle radio frequency identification device. In one embodiment, an owner or operator of the vehicle access zone could charge a fee for passage of vehicle through the vehicle access zone.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION OF THE INVENTION

In one embodiment of the invention, the commercial viability may be enhanced by the minimization of the number and complexity of mechanisms required to convert between a driving and flying mode, while at the same time, maintaining a design that will fly in a manner that will be familiar to most general aviation pilots, and drive in a manner that is familiar to most drivers. Another advantage of the present invention can include the ability to change between the driving and flying modes without the operator leaving the cockpit/driver's seat, in contrast to many vehicles in the prior art. No manual "bolting" or "unbolting" is required, simply a typical pre-flight inspection that pilots are already accustomed to performing on their aircraft. Another advantage of the present invention may be the protection of the propeller due to its location relative to aerodynamic surfaces.

One embodiment of the invention can contain deformable aerodynamic surfaces as bumpers, thereby improving the practicality of the vehicle by reducing the sensitivity of the device to low-speed impacts and improving the aerodynamic efficiency while in the air. This improved durability will reduce the insurance costs to the owner, improving the practicality over any prior art.

One embodiment of the invention can also include the integration of lights and/or license plates into the movable control surfaces on the trailing edges of the aerodynamic surfaces. Automotive lights and license plates are important for reasons of vehicle certification on the ground, but they are typically aerodynamically undesirable in the air due to their blunt trailing edge surfaces. By embedding the lights and license plates in the aircraft's control surfaces, the present invention can solve these aerodynamic issues in the air while adding the minimum possible mechanical complexity to the design. One embodiment of the invention can also include the use of radio-frequency identification (RFID) systems for easy and safe airport access, and monitoring thereof.

Figure 1:
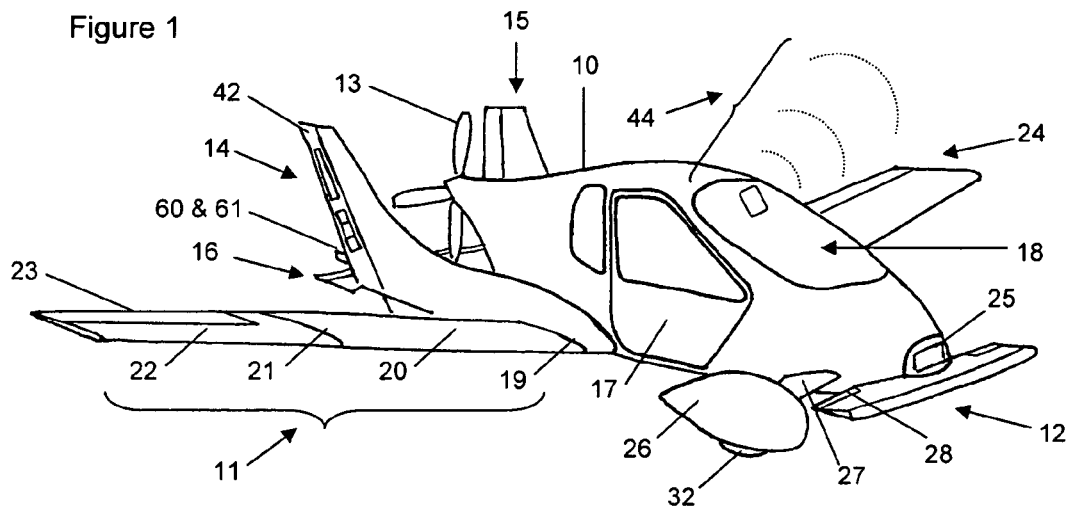
FIG. 1 is a schematic perspective view of a flying and driving vehicle with wings extended in an aircraft mode, in accordance with one embodiment of the invention.

One embodiment of the invention is illustrated in FIGS. 1-5. FIG. 1 shows the vehicle in airplane mode where it is configured for flight. The vehicle contains a fuselage 10 for holding a pilot, a number of passengers and accompanying baggage. In one embodiment, the fuselage may be large enough only for a pilot. In alternative embodiments, the fuselage can hold any appropriate number of passengers, such as, but not limited to, one, two, three, or more passengers in addition to a pilot. In a further alternative embodiment, the fuselage may be configured to hold a pilot and a co-pilot, with flight controls for each.

The fuselage has a windshield 18 and side doors 17. The fuselage 10 is connected to a centrally-located folding main wing assembly 11 (right) and 24 (left) including an inboard 20 and outboard 22 wing section. Although it is not explicitly marked on the figures, left-right symmetry may be assumed, in one embodiment of the invention, at least for one of the wing surfaces, the fuselage, and the other lifting surfaces. Roll control is accomplished by ailerons 23 located at the trailing edge of each outboard 22 wing section. The fuselage 10 is also connected to a smaller wing, or canard, 12. The canard 12 can also provide a lifting force that stabilizes the vehicle in pitch. The canard 12 can contain a pitch control device 28 on each end of the canard. In one embodiment, the pitch control device 28 is a pitch trim tab. In one embodiment, the pitch control device can also be used as the primary means of pitch control, also known as an elevator. Stability in yaw can be accomplished by two vertical stabilizers 14 (right) and 15 (left). In an alternative embodiment, only one vertical stabilizer is required. Yaw control can be accomplished by a rudder 42 located on each of the vertical stabilizers 14, 15. The vehicle can be propelled, while configured for flight, by a propeller 13. When configured for driving, the propeller 13 may be held stationary and the wheels can be driven from the same power plant.

In one embodiment of the invention, jet engines, rockets, or other appropriate means of propelling an aircraft may be used. In one embodiment, a single power plant may be used to drive both the propeller, during flight, and the wheels, during driving. For example, a switching mechanism may be used to switch a power plant from providing a rotational force to a propeller system to providing a torque to one or more wheels of the vehicle. This switching mechanism may be mechanical and or electrical, and may only be engaged when the vehicle is on the ground. The vehicle may or may not also have to be stationary for the switching mechanism to function.

In an alternative embodiment, more than one power plant may be incorporated into the vehicle. For example, an electrical propulsion means may by used to drive the vehicle when on the ground, while an internal combustion engine may be used to drive the propeller system when in the air. In general, any appropriate power plant, including an internal combustion engine, an electrical, a chemical, a nuclear, or other appropriate power generation system, or any other appropriate power plant may be used for either or both the air and the ground propulsion systems.

Figure 2:
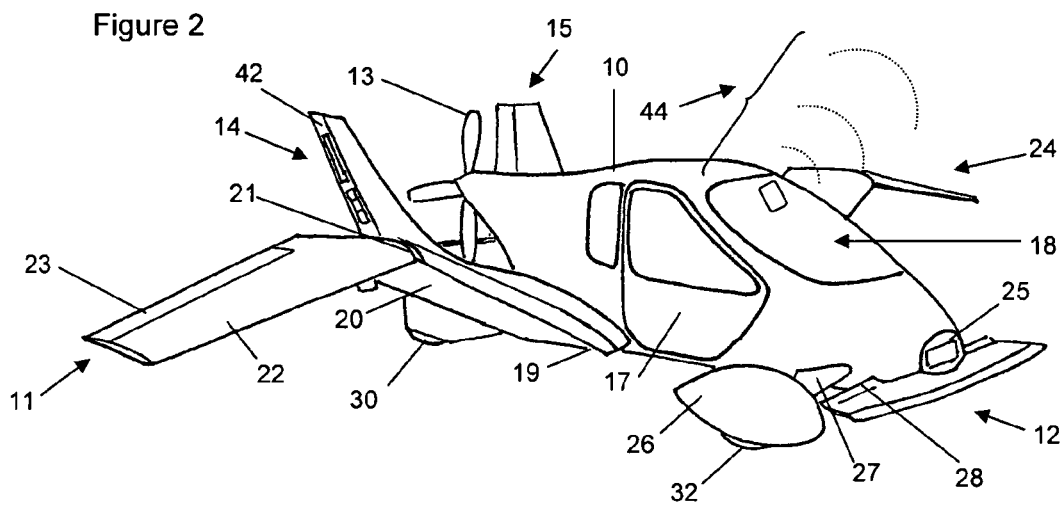
FIG. 2 is a schematic perspective view of the flying and driving vehicle of FIG. 1 in the middle of a wing folding operation.

FIG. 2 shows the vehicle in the middle of the process of folding or unfolding the main wings 11, 24. In one embodiment, there are two wing folds, an inner wing fold 19 around which the inner wing section 20 pivots, and an outer wing fold 21 which attaches the outer wing section 22 to the inner wing section 20. In alternative embodiments, a greater or lesser number of folds may be used.

Figure 3:
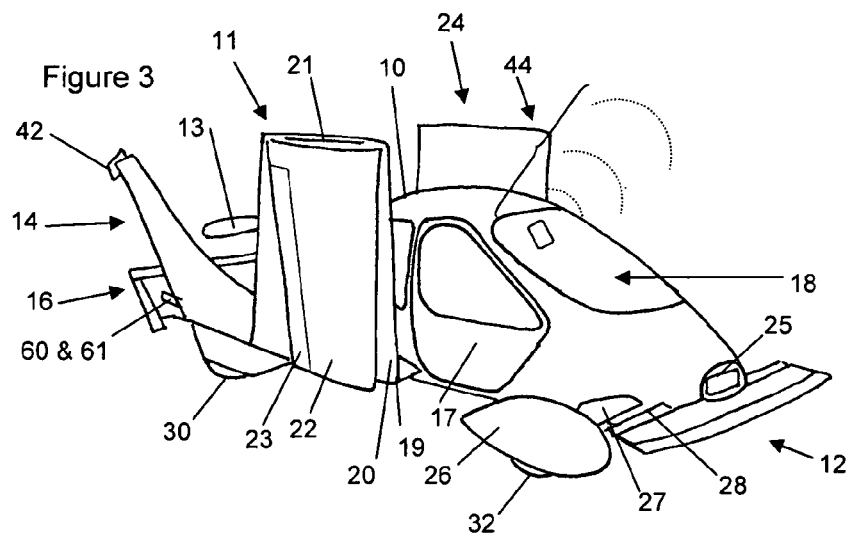
FIG. 3 is a schematic perspective view of the flying and driving vehicle of FIG. 1 with the wings folded up in a driving mode.

FIG. 3 shows the vehicle configured for driving. The wings 11, 24 are folded along the sides of the fuselage 10. The combination of the folded-up wings 11, 24, the vertical stabilizers 14, 15, the horizontal stabilizer 63, and the elevator/bumper assembly 16, help to shield the propeller 13 from road debris. Since most aircraft of this size weigh considerably less than most automobiles of the same size, the vehicle may be more susceptible to gusts and bumps on the road. In order to alleviate this difficulty, the pitch control device 28 located on the canard 12 can be deflected upwards so as to provide a road-hugging down-force while driving. In one embodiment, the wings are folded such that at least a portion of the wing is held in a vertical, or substantially vertical orientation when folded. In an alternative embodiment, the wings may be folded to a less than vertical orientation, for example, within the range of 60-90 degrees from the horizontal.

The elevator 16 can also be deflected upward. This can accomplish two things. First, like the canard 12, it can produce a road-hugging down-force while driving. Second, it can act as the vehicle's rear bumper. This is shown in more detail in FIGS. 5 and 7. In this embodiment, the front license plate is mounted behind a clear faring 25. In states where no front license plate is required, the faring 25 may bean opaque color matching the rest of the vehicle, with no license plate mounted therein. In one embodiment, the four wheels 32 (front), 30 (back) are located far from the center of gravity of the vehicle so as to provide a smooth ride on the ground. The front wheels 32 can be connected to the fuselage 10 by a strut 27. In order to reduce the aerodynamic drag of the front wheels 32, a removable aerodynamic faring 26 may be placed over the front wheels 32. One embodiment of the invention may include a four-wheeled vehicle for on-road stability, although a three-wheeled vehicle, which could then be certified as a motorcycle, may also be used. In alternative embodiments, a greater or lesser number of wheels may be used. In this mode, the exterior dimensions of the vehicle, in one embodiment of the invention, fit inside a standard 1-car garage (for example, less than 8'×8'×20').

Figure 4:
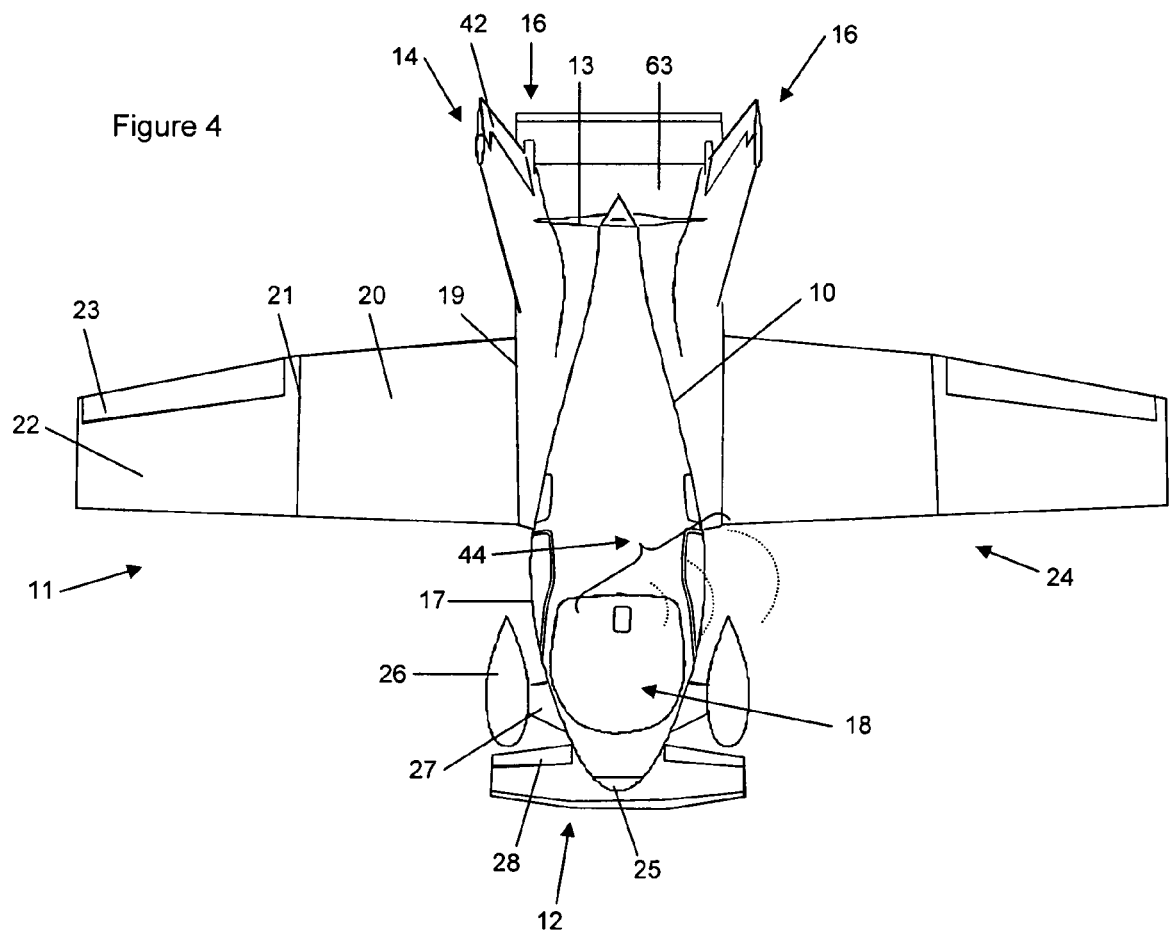
FIG. 4 is a schematic plan view of the flying and driving vehicle of FIG. 1 in an aircraft mode.

FIG. 4 shows a top view of the vehicle. In this view it is possible to see the horizontal stabilizer 63. In one embodiment, the horizontal stabilizer is essentially the center section of the main wing 24, 16. In an alternative embodiment, the horizontal stabilizer may be a separate element. The vertical stabilizers 14, 15 may be located on top of the horizontal stabilizer 63. The elevator/bumper assembly 16 may be located at the aft end of the horizontal stabilizer 63.

Figure 5:
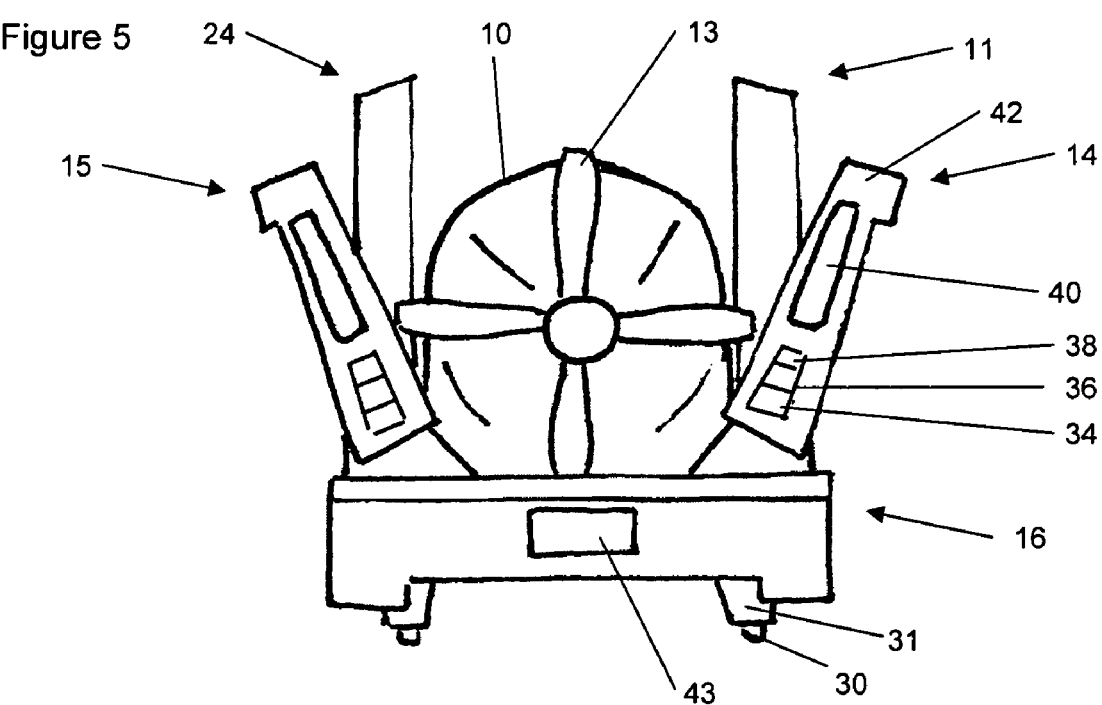
FIG. 5 is a schematic rear view of the flying and driving vehicle of FIG. 1 in a driving mode.

FIG. 5 shows the vehicle from the back, while configured for driving. The rudders 42 may fold inward to display their outer surfaces. Embedded flush with the surface are the required automotive lights, the tail lights 34, the reverse lights 36, the turn signals 38, and the brake lights 40. In alternative embodiments, any automotive indicator element, such as any of the illumination or identification elements described herein, may be embedded with the surface. The surface of these elements may be placed flush with the surface of an aerodynamic element, be raised above the surface of the aerodynamic element, or be recessed below the surface of the aerodynamic element. The bumper/elevator 16 may fold up to display the license plate 43, or other identification element. FIG. 5 shows one embodiment of the illumination element arrangements, but any legal arrangement of lights or other illumination elements on the rudders 42, the elevator/bumper 16 or any rear facing surface is possible. Placing the lights on control surfaces allows the plane to have no blunt trailing edges while configured for flight, yet allows for the required surface area for the placements of lights that meet the automotive requirements.

Figure 6:
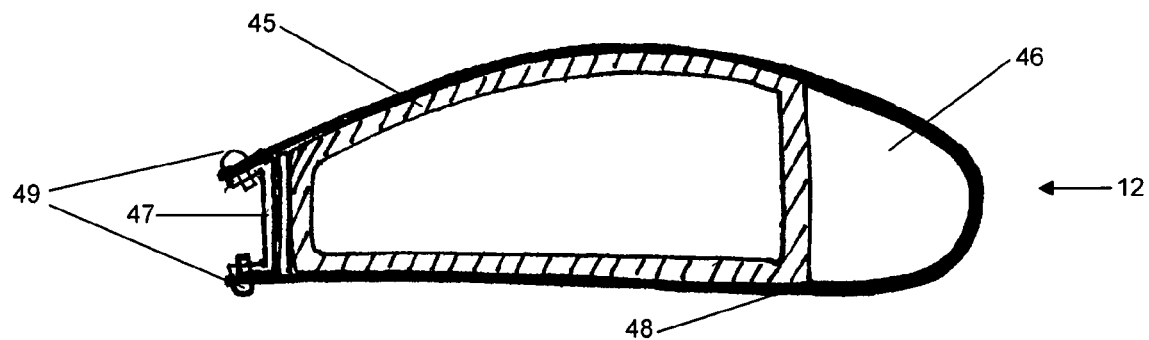
FIG. 6 is a schematic cross-sectional side view of a canard/bumper structure, in accordance with one embodiment of the invention.
Figure 7:
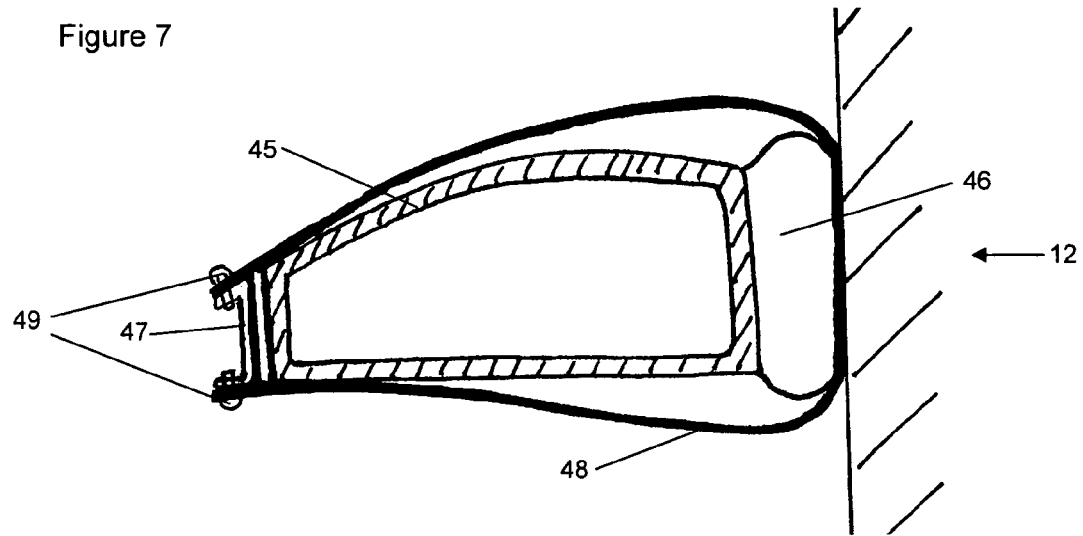
FIG. 7 is a schematic cross-sectional side view of the canard/bumper structure of FIG. 6 during a low speed impact.

FIG. 6 shows one embodiment of a cross-section of the canard/bumper assembly, 12 including an impact protection element. The structure is a box-beam 45 with a foam-rubber or other molded elastomeric leading edge core 46. A bent aluminum sheet, or any other appropriate rigid material, can be formed into a channel 47 and attached to the aft surface of the box-beam. Other materials may include, but are not limited to, a plastic, metal, wood, composite material, or other material with appropriate properties. In this embodiment, a highly resilient thermoplastic sheet 48 is molded to the outer airfoil shape and mechanically fastened 49 to the channel 47. The mechanical fastening may include a glued, welded, screwed, riveted, or otherwise attached connection. This allows for a smooth exterior surface. In an alternative embodiment, it is possible to construct the canard/bumper 12 without the sheet 48. FIG. 7 illustrates the impact characteristics of this structure, in one embodiment of the invention. This type of construction presents a clear advantage in terms of resiliency for low-speed impact on the ground. In alternative embodiments, the impact protection element may be incorporated into any aerodynamic element of the flying and driving vehicle.

Figure 8:
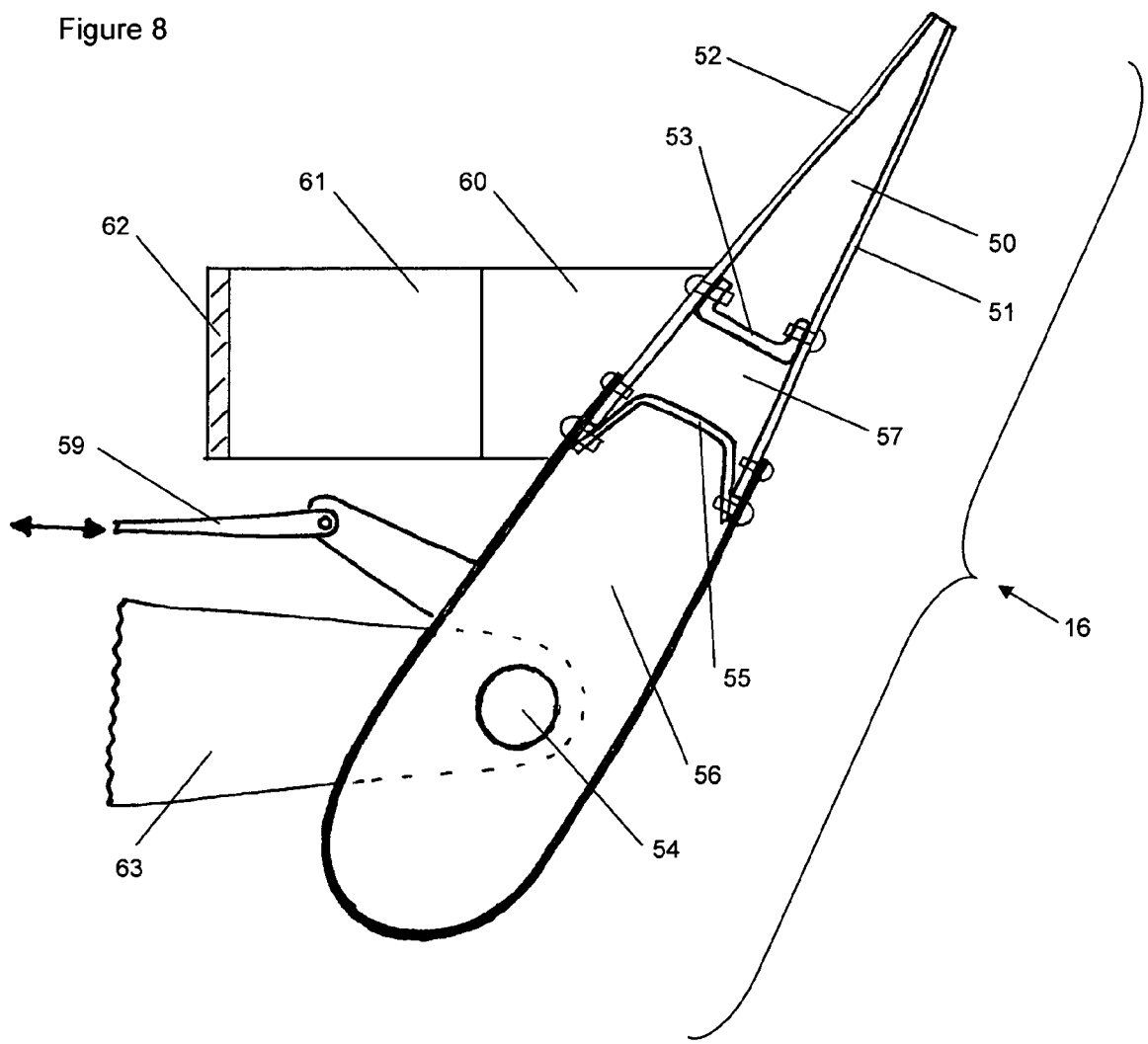
FIG. 8 is a schematic cross-sectional side view of a rear elevator/bumper, in accordance with one embodiment of the invention.

FIG. 8 shows a similar resilient design of the elevator/bumper 16 positioned in the rear of the vehicle, in one embodiment of the invention. A foam rubber or other molded or otherwise produced elastomeric core 50 is sandwiched between two sheets of resilient plastic 51, 52 which are bonded to the foam rubber core and mechanically fastened to an aluminum, or other suitable material, "C-channel" stringer 53 and the skin of the bumper/elevator 16. A larger stringer 55 serves to close off the hollow section 56 from an intermediary filled section 57. The entire elevator/bumper assembly is pivoted around point 54 and a push-rod control arm 59 controls the angle of the elevator/bumper. The pivot point is connected to the horizontal stabilizer 63. When configured to drive, the elevator/bumper 16 is pulled up to rest upon the support arm 60 which has a crushable cylinder 61 between it and the structural hard-stop 62. The cylinder may be designed to crush under high-speed impact loads thereby absorbing some of the impact impulse and giving the operator a clear indication that the vehicle has been hit hard and should be inspected. In alternative embodiment, any other appropriate pivoting mechanism may be used to provide the pivoting motion for the aerodynamic element.

Figure 9:
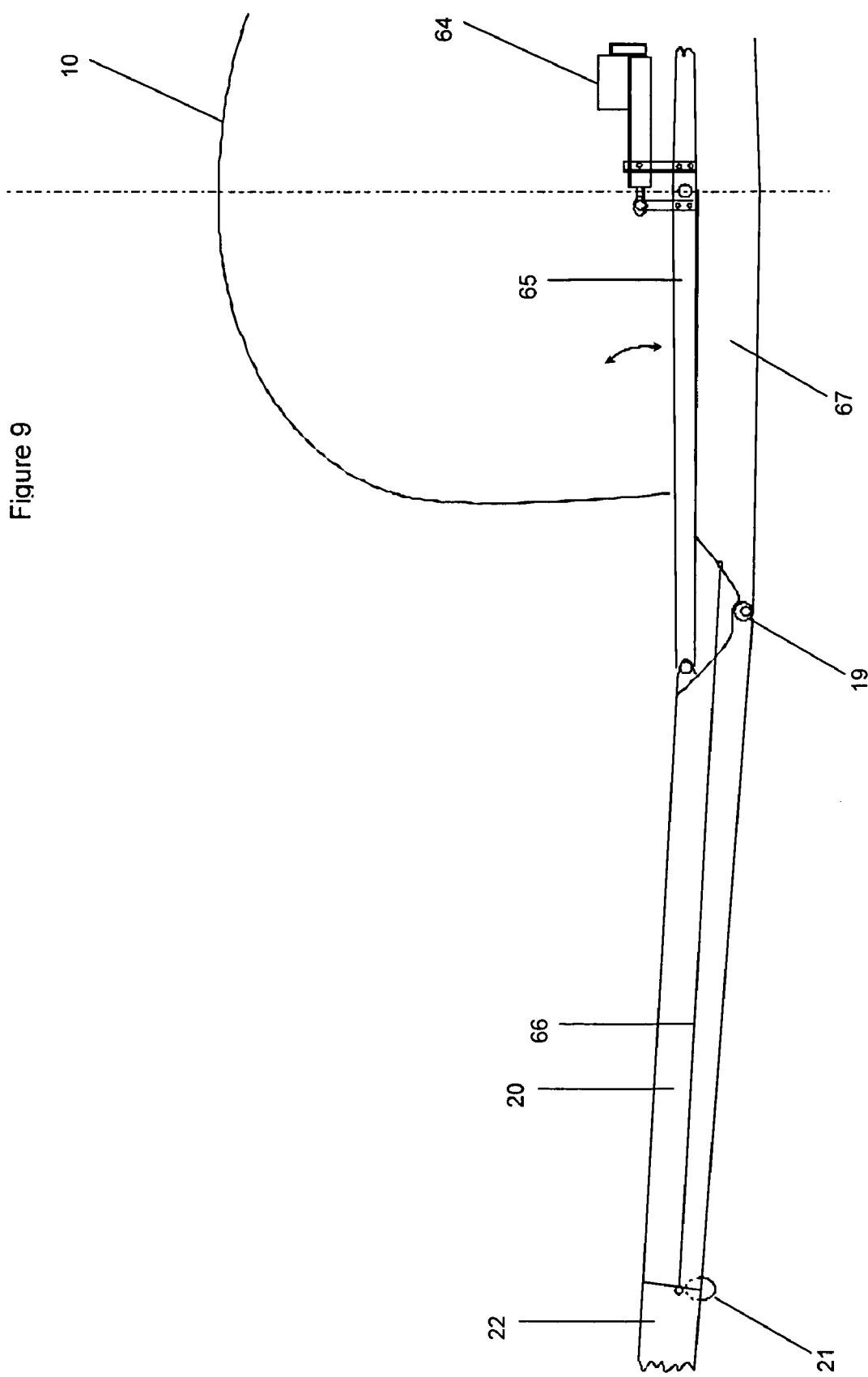
FIG. 9 is a schematic side view of a wing folding mechanism in an extended configuration, in accordance with one embodiment of the invention.

FIG. 9 shows the detail of a wing folding mechanism in the extended wing configuration, in accordance with one embodiment of the invention. The folding motion may be driven by a single linear electric actuator 64 which is attached to the primary structural folding beam 65 of each wing. In an alternative embodiment, multiple actuators may be employed. In a further alternative embodiment, one or more actuators may be electric, hydraulic, and/or mechanical. The actuator 64 moves vertically along a path 68 during folding and extension of the wings. In one embodiment of the invention the actuator 64 may be free to move along with the beams 65. In an alternative embodiment, a track, or other support mechanism, may be used to support the movement of the actuator 64 during folding and extension of the wings.

When the actuator 64 extends, the primary structural folding beams 65 are pivoted about a central pivot point 69, thereby pulling in the inner wing section 20. An outer fold extension cable 66 may be attached at one end to the main spar in the fuselage 67 and at the other end to the outer wing 22 around the outer wing fold hinge 21. In one embodiment, shear pins, or other appropriate locking mechanisms, may be used to releasably lock the wings in a rigid extended configuration during flight.

Figure 10:
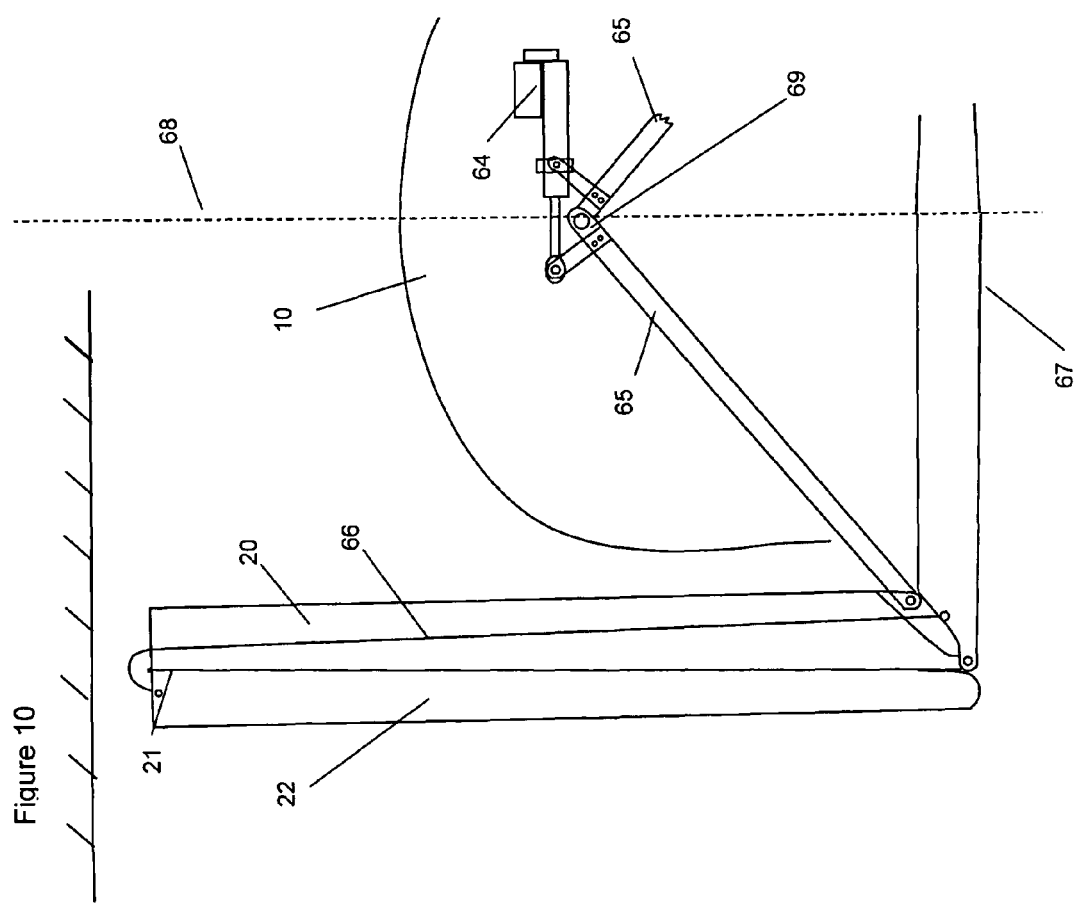
FIG. 10 is a schematic side view of the wing folding mechanism of FIG. 9 in a folded configuration.

FIG. 10 shows a wing folding mechanism in the folded up configuration. When the actuator 64 is contracted and the primary structural folding beam 65 is straightened to a horizontal position (as shown in FIG. 9), the inner wing section 20 is pushed down to its extended position and the fixed outer fold extension cable 66 effectively pulls up the outer wing section 22 to be in line with the inner wing section 20. When the wing is folded up, a torque spring at the outer wing hinge 21 and permanent magnets near the wing tip and root may be used to hold the outer wing section up flush against the inner wing section.

This or another embodiment of a folding wing mechanism can include a double fold, one at the wing root and the other roughly half way along the length of the wing. Both folds can be driven by a single actuator located inside the root fold. This configuration allows the weight of the actuator to be supported by the heavier structure near the wing root, where there is more room for such an actuator. The mechanism also uniquely defines the relative position/orientation of the outer wing section with respect to the fuselage of the aircraft for a given position of the inner wing section. This kinematic arrangement precludes either premature unfolding of the outer section (which could cause it to travel too high) or delayed unfolding (which could cause the outer wing section to contact the ground). This invention is particularly useful for roadable aircraft which must fold their wings to fit inside of a garage or parking/storage space, but it also useful for aircraft stowed on board an aircraft carrier or in any similar environment where physical space is at a premium.

In one embodiment, a piston-style linear actuator at the root of the aircraft drives an arm connected to a shaft about which the inboard section of the wing rotates. This section of wing need not be rigidly affixed to the shaft. Rather, there are arched tracks in the wing section through which a bolt attached to the aforementioned arm is free to travel an angular distance of approximately 30 degrees. Once that bolt moves that distance, it starts lifting the inner wing section up into its final position (which may be approximately another 80 degrees of rotation in the one implementation). During the first approximately 30 degrees of travel, the shaft is rotating with respect to the inner wing section. It is this relative rotation of the shaft with respect to that section of wing which drives arms that unlock the shear pins that hold the wing rigid to itself and the fuselage during flight.

One advantage of this design may be that structural loads are transmitted through appropriately designed shear pins—not through the actuator itself. The actuator need only be strong enough to remove the shear pins and lift the weight of the wing—it does not need to hold any flight loads. All flight loads are transmitted through the locking pins.

In one embodiment, the outer section of wing can be actuated by an arm that rotates within the inner section of the wing. The pivot point of this arm can be fixed to the inner section of the wing (off the axis of wing rotation). This arm can be driven by a geared face that meshes with an arm rigidly attached to the fuselage, and in one embodiment can be centered around the axis of wing rotation. With this arrangement, when the inner wing is pushed up, the motion of the arm with respect to the fuselage causes the arm to rotate, and pull or reel-out a cable which connects to the outer wing section.

The folding wing mechanism can optionally also include mechanisms for visual and/or tactile inspection of the wing locking pins through holes in the skin of the vehicle, which give pilots a higher level of confidence in the mechanism. One of the advantages of this design may be that it allows for a single linear actuator to lock, unlock, and fold both sections of wing without any other powered drive system—saving weight by reducing the number of actuators.

Ease and practicality of operation may be important components of the invention represented herein. Designed for operation by trained and certified pilots within the widespread existing general aviation airport infrastructure, the vehicles described herein can provide individual pilots with more functionality and options than are currently available in any existing aircraft. In one embodiment of the invention, in use, a pilot wishing to use this vehicle could begin their trip at home, with the vehicle fitting within a standard household garage when in driving mode (as shown in FIG. 3). Leaving home, the pilot could drive to a local airport. A radio-frequency identification device (RFID device) may, in one embodiment, interact with a counterpart RFID device at the airport to allow simple and secure access to the runway area, for example though a gated fence.

Once at the airport, the transformation from driving to aircraft mode may be accomplished electro-mechanically, or by other appropriate means, for example with push of a button inside the cockpit. In one embodiment, several security interlocks may be imposed on this transformation such as, but not limited to, weight on wheels, stationary with respect to the ground, engine off, and security personal identification number (PIN) entry. Once in aircraft mode, the pilot may conduct a standard preflight and prepare for takeoff.

If the pilot were to encounter inclement weather, or other problem, along the route, the nearest airport could be located, either through traditional navigation techniques or through the use of a Global Position System (GPS) device in the cockpit. After landing at this airport and safely clearing the runway, the pilot could transform the vehicle back to driving mode—again, in one embodiment, with several security and safety interlocks—and drive off of the airport with secure and convenient access. Again, this could be facilitated by the use of an RFID system including an RFID device in the vehicle and another device, in communication with the vehicle's RFID device, associated with the airport. Continuing the trip on the ground, the pilot has the option of returning to the air at another airport if the weather clears, as all of the necessary components for driving and flying are integral parts of the vehicle at all times. This is an advantage of this type of design over a non-integrated vehicle. Once at the destination airport, the need for the pilot to coordinate ground transportation is eliminated as this vehicle can take the pilot directly to his final destination without additional waiting or transferring baggage.

Alternative embodiments of the invention are also contemplated. For example, fewer wheels, such as two or three, or more wheels, such as six or eight, may be used, with or without stabilizing secondary side wheels or skids. Other embodiments may include the inclusion of a ballistic full-vehicle parachute, or use of an alternative propulsion device other than the propeller. Alternative propulsion devices could include a turbine engine either driving a shaft or providing jet propulsion in the air. A hybrid electrical propulsion system could also be employed, increasing efficiency of operation on the ground. Another possible embodiment may include two or more separate engines in the vehicle. One would drive the propeller in aircraft mode; the other would drive the wheels in drive mode.

Additionally, though a two-seat side-by-side passenger configuration is shown, other seating arrangements (two-seat tandem, single seat, or four or more places) could be extrapolated from the design shown. While the seating configuration shown was designed to meet the Federal Aviation Administration (FAA) Light Sport Aircraft (LSA) standards, the design could be adapted to meet other classes of FAA certification or Experimental operation. One change that could result in a shift in classification would be the replacement of the fixed landing gear shown with retractable gear, or a form of amphibious floats.

Though not shown, external rear visibility could be accomplished through several means. One means is that of internal mirrors supplemented with a rear-vision camera system that would be displayed in the cockpit. Alternatively, periscoping mirrors could be deployed while on the ground and stowed during flight to minimize their drag impact.

While one embodiment may contain a pitch trim tab 28 on the canard 12, and the elevator 16 on the horizontal stabilizer 63, another possible embodiment is to swap the function of the elevator 16 and the pitch trim tab 28. Thus the primary means of controlling pitch would be located on the canard 12. Finally another possible embodiment is to place flaps onto the main wing to increase lift at low flight speeds.

In addition to use for airport access, a vehicle-based RFID system could be used for other airport operations as well, such as fee collection or gathering usage statistics. The vehicle could also be built with any other accessibility or security technology used in the airport infrastructure now or in the future, or the vehicle could be operated without the RFID airport access system in place.

This vehicle design and components can incorporate a number of advantages over prior flying and driving vehicles. For example, an integrated vehicle design may be preferable over all other dual-use vehicle configurations in that the vehicle is always both flight- and drive-ready; key components are not left at either a garage or airport location, or carried in a cumbersome trailer.

Automatic transformation capability between flying and driving configurations may be advantageous in that the pilot does not have to carry tools, connect or disconnect portions of his aircraft, or spend additional time outside of the cockpit. Safety may also be increased by not requiring the pilot to act as a mechanic, a role for which he may not be fully trained. The combination of the integrated design and the automatic transformation capability make inclement-weather operation, particularly in the case of a diverted landing before reaching an approaching storm, less burdensome.

The simple dual-fold wing removes unnecessary complexity from the vehicle in terms of rotating, telescoping, or other complex mechanisms that have been presented in a number of prior art designs. It is generally accepted by those skilled in the art that simplicity is not only desirable from a commercial manufacturing perspective but also from a safety and usability view-point.

When in driving mode, the vehicle presented here will fit within the confines of a standard house-hold garage (as defined as 8'×8'×20'). This presents a significant practical advantage over other dual-use vehicle concepts and traditional aircraft in that the owner does not have to pay to hangar the vehicle, can load their bags into the vehicle at home without having to transport them at the airport, and can park easily at their final destination. In an alternative embodiment, a larger vehicle may be used. This vehicle may, for example, be similar in size to a van or bus, and may therefore carry more passengers and/or freight.

By being a roadable aircraft and requiring the operator to be both a licensed pilot and a licensed driver, and by operating within the existing airport infrastructure, this vehicle should not present safety risks to the general public that are often associated with the notion of a "flying car".

One embodiment of the invention can include means of protecting the propeller while on the ground. The protected nature of the propeller on the ground can significantly reduce both the potential for damage from road debris to the propeller when the vehicle is driving and the noise heard by those on the ground when the vehicle is flying. These are both advantageous, as damage to the propeller can at best be costly to repair and at worst dangerous, and noise abatement at local airports is a widespread concern. The configurations presented here can offer these advantages without the additional weight and complexity of a ducted fan configuration (such as meeting required tight clearances at the blade tips).

In one embodiment, the propeller may be locked in place when on the ground. Locking the propeller in place so that it is stationary on the ground while driving the wheels for propulsion eliminates the potential hazard of back wash or spinning propeller blades that would otherwise exist on the ground in the road environment.

One embodiment of the invention includes an integrated deformable bumper. By integrating a deformable bumper surface into the leading-most and trailing-most edges of the vehicle, the road durability of the vehicle is significantly increased. These bumper surfaces can protect the vehicle against damage from low-speed impact on the ground without increasing the drag profile of the vehicle in flight.

One embodiment of the invention can include integrated illumination and/or identification elements on one or more aerodynamic elements, and/or on the fuselage of the vehicle. The integration of the required tail, reverse, brake and turn signal lights into the rudder surfaces of the vehicle allow for practical roadability without the sacrifice in flight performance typically incurred from previous, blunt trailing-edge implementations of these features. In one embodiment, enclosing the front license plate in a flush faring and embedding the rear license plate in the underside of the elevator surface are additional ways in which required road functionality is integrated simply and effectively without aerodynamic penalty into the vehicle.

Figure 11:
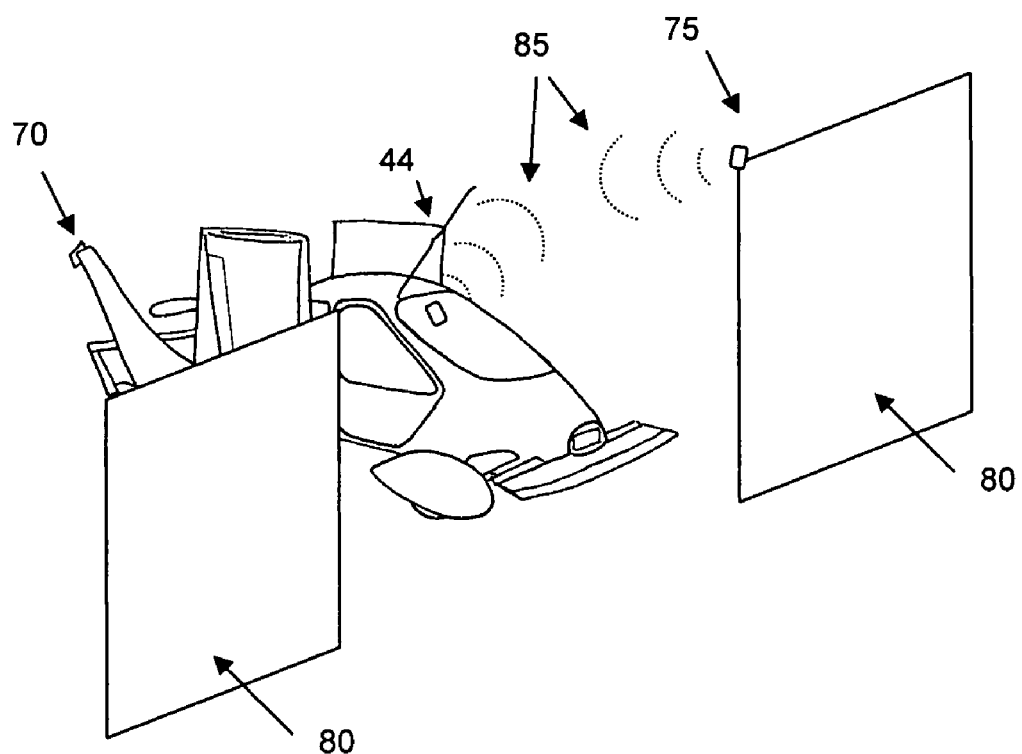
FIG. 11 is a schematic perspective view of a flying and driving vehicle with a radio frequency identification system, in accordance with one embodiment of the invention.

One embodiment of the invention can include a radio frequency identification (RFID) system. An example RFID system is shown in FIG. 11. This RFID system can include a radio frequency identification device 44 associated with a flying and driving vehicle 70 and a radio frequency identification device 75 associated with an airport vehicle access zone 80, such as a gate in a perimeter fence. These devices can be adapted to communicate identification information therebetween 85, such that a vehicle 70 can be given access and egress to and from an airport automatically upon the communication of certain information between the devices.

In use, a flying and driving vehicle can be allowed access to and egress from an airport having a vehicle access zone, by communicating identification information between a radio frequency identification device associated with a flying and driving vehicle and a radio frequency identification device associated with the vehicle access zone. An analysis device associated with the airport RFID device can then determine whether at least one of access and egress of a given vehicle is permitted, and allow passage of the vehicle through the vehicle access zone if valid identification information has been communicated.

In one embodiment, vehicle and/or driver/pilot identification information can be communicated. The identification information can include at least one of a name, an address, a nationality, a vehicle registration number, a pilot license number, an automobile license number, a membership number, a security code, a credit card number, and combinations thereof.

In one embodiment, the vehicle identification information can be stored by the vehicle access zone radio frequency identification device. The vehicle identification information can also be transmitted to a remote location for analysis, storage, and/or security purposes. For example, the information could be sent to the airport control tower, the Federal Aviation Administration, a security administration (such as the Department of Homeland Security), or other relevant authority.

In one embodiment, the RFID device can be removed from the vehicle. In one embodiment, the vehicle radio frequency identification device is adapted for use independently of the vehicle to permit personal access to and egress from the airport. This can allow a user to carry the device for entry and egress from the airport by foot or other mode of transportation, and also allow the device to be placed in another vehicle.

In one embodiment, information can be inputted into the vehicle RFID device, for example through at least one of a key pad, a touch sensitive pad, a mouse pad, a roller ball, a switch, a button, a dial, a wireless connection, and combinations thereof, associated with the device. This can allow the device to include security locks and/or safety locks allowing the device to only be used by authorized users, or allow the device to be used by multiple users with different identification information. Another security and/or safety feature may include activating and deactivating the vehicle radio frequency identification device when not in use or in possession of the user. In one embodiment, an owner or operator of the vehicle access zone could charge a fee for passage of vehicle through the vehicle access zone. This fee could be charged directly to an account associated with the identification information communicated, or be charged to an account associated with information inputted into the vehicle device at the time of entry (such as a credit card number).

In one embodiment, the RFID airport access system has the advantages of being able to integrate directly with the existing airport accesses security systems that are in place at many local airports already. Incorporating a more universal access system into the vehicle itself, the pilot has the freedom to travel between airports unannounced, as his travel plans and weather avoidance needs dictate.

By targeting the Federal Aviation Administration (FAA)'s Light Sport Aircraft (LSA) category, one embodiment of the invention has significant advantages in certification and commercialization due to the simplified certification process associated with the LSA rules and the broader market base of potential Sport Pilots, in addition to existing pilots.

The roadable aircraft (as defined as a vehicle capable of flying and driving) presented in the various embodiments described herein embodies several unique features which make it more practical, more usable, and more commercially realizable that previous dual-use vehicles. The integrated configuration and simple, automated transformation mechanism make this vehicle safer and more convenient for pilots to use. In one embodiment, the protected nature of the propeller can reduce the probability of damage to this critical component while on the road and reduces noise in the airport environment. The deformable aerodynamic bumpers can add basic road collision durability to the airframe without drag penalties in flight. The embedded lights and license plates can facilitate legal and safe road usage, also without extraneous complexity or performance penalties in flight. The RFID system can facilitate safe and convenient airport access.

This vehicle has the potential to change the way in which pilots use their ability to fly. Currently, individual pilots use their skills primarily for fun and non-business travel, citing weather sensitivity, cost, door-to-door travel time and lack of mobility at their destination as their main reasons for not flying more often. This vehicle addresses all four of these barriers to flight simultaneously in the most complete, practical, and commercially viable implementation to date. By allowing the trip to continue on the ground, the usage of this vehicle could significantly lower the incidence of one of the leading causes of general aviation accidents, ill-preparedness for inclement weather. Though designed for and marketed to the general aviation and pilot communities, the vehicles described herein demonstrate the capability to inspire growth in those communities.

It should be understood that alternative embodiments, and/or materials used in the construction of embodiments, or alternative embodiments, are applicable to all other embodiments described herein.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:
1. A flying and driving vehicle comprising:
  a fuselage;
  a main wing mounted to the fuselage and oriented substantially symmetrically about a central elongate axis of the vehicle, wherein the main wing is deployable between a folded configuration and an unfolded configuration;
  a folding mechanism configured to deploy the main wing between the folded configuration and the unfolded configuration, wherein the folding mechanism comprises an actuator for controlling at least one folding beam pivoted about a pivot point disposed proximate the fuselage, wherein the actuator and the at least one folding beam are configured to lock an inner wing section of the main wing;
  at least one first aerodynamic control surface configured to provide longitudinal stability and control primarily about a yaw axis of the vehicle when in flight;
  a second aerodynamic control surface configured to provide stability and control primarily about a pitch axis of the vehicle when in flight;
  a plurality of wheels configured to support the vehicle when on the ground, wherein at least one of the plurality of wheels is located aft of a center of mass of the vehicle, and at least one of the plurality of wheels is located in front of the center of mass of the vehicle;
  a first propulsion mechanism configured to provide a means of moving the vehicle on the ground, wherein the first propulsion mechanism comprises a torque applied to at least one of the plurality of wheels; and
  a second propulsion mechanism configured to provide a means for propelling the vehicle when in flight, wherein the second propulsion mechanism comprises a means of accelerating an airflow in a rearward direction.

2. The vehicle of claim 1, wherein at least a portion of the main wing is oriented substantially vertically with respect to the ground when in the folded configuration.

3. The vehicle of claim 1, wherein the main wing comprises at least two folding sections on each side of the central elongate axis of the vehicle.

4. The vehicle of claim 1, wherein the main wing comprises at least one aileron control surface to enable control of the vehicle primarily about a roll axis of the vehicle when in flight.

5. The vehicle of claim 1, wherein the second aerodynamic control surface is located on the secondary wing.

6. The vehicle of claim 5, wherein the second control surface is adapted to produce a downward force on the vehicle when driving.

7. The vehicle of claim 1, wherein the secondary wing is located at a front end of the fuselage.

8. The vehicle of claim 7, wherein the secondary wing is adapted to provide front impact collision protection while the vehicle is on the ground.

9. The vehicle of claim 1, wherein the horizontal surface is an extension of the main wing.

10. The vehicle of claim 1, wherein the second control surface is located on the horizontal surface.

11. The vehicle of claim 10, wherein the second control surface is adapted to provide rear impact collision protection while the vehicle is on the ground.

12. The vehicle of claim 11, wherein the second control surface is adapted to produce a downward force on the vehicle when driving.

13. The vehicle of claim 10, wherein the second aerodynamic control surface is adapted to provide at least one automotive indicator or identification element.

14. The vehicle of claim 1, wherein the second control surface is located on both the secondary wing and the horizontal surface.

15. The vehicle of claim 1, wherein the second propulsion mechanism comprises at least one propeller.

16. The vehicle of claim 15, wherein the least one propeller is located at an aft portion of the fuselage.

17. The vehicle of claim 1, further comprising at least one substantially vertical stabilizer mounted to the fuselage.

18. The vehicle of claim 17, comprising two substantially vertical stabilizers mounted to the fuselage on either side of the second propulsion mechanism.

19. The vehicle of claim 18, wherein the stabilizers are adapted to provide protection for the second propulsion mechanism from road debris during driving and reduce propulsive noise during flying.

20. The vehicle of claim 17, wherein the at least one first aerodynamic control surface is mounted to the at least one stabilizer.

21. The vehicle of claim 20, wherein the first aerodynamic control surface is adapted to provide at least one automotive indicator or identification element.

22. The vehicle of claim 1 further comprising a secondary wing located in front of the main wing and configured to provide horizontal stabilization of the vehicle when in flight.

23. The vehicle of claim 1 further comprising a substantially horizontal surface located underneath the second propulsion mechanism to provide protection from road debris for the second propulsion mechanism when driving.

24. The vehicle of claim 1, wherein when the actuator is in an extended position, the main wing is in the folded configuration.

25. The vehicle of claim 1, wherein when the actuator is in a contracted position, the main wing is in the unfolded configuration.

26. The vehicle of claim 1, wherein the actuator is disposed within the fuselage.

27. The vehicle of claim 1, wherein the actuator is disposed above the at least one folding beam.

28. The vehicle of claim 1 further comprising an outer wing section pivotally connected to the inner wing section and deployed automatically between the folded and unfolded configurations by an extension cable.

29. The vehicle of claim 1 further comprising a radio frequency identification system for the vehicle, the radio frequency identification system comprising:

a first radio frequency identification device associated with the vehicle; and a second radio frequency identification device associated with an airport vehicle access zone, wherein the radio frequency identification devices are adapted to communicate identification information therebetween.

30. The vehicle of claim 29, wherein the second radio frequency identification device is adapted to determine whether at least one of access and egress are permitted, and to allow the vehicle into the vehicle access zone if permitted.

31. The vehicle of claim 29, wherein the identification information comprises at least one of a name, an address, a nationality, a vehicle registration number, a pilot license number, an automobile license number, a membership number, a security code, a credit card number, and combinations thereof 32. The vehicle of claim 29, wherein the identification information is stored by the vehicle access zone radio frequency identification device.

33. The vehicle of claim 29, wherein at lease one of the first and the second radio frequency identification devices are adapted to transmit the identification information to a remote location.

34. The vehicle of claim 29, wherein the first radio frequency identification device is removable from the vehicle.

35. The vehicle of claim 34, wherein the first radio frequency identification device is adapted for use independently of the vehicle to permit personal access to and egress from the airport.

36. The vehicle of claim 29, wherein the first radio frequency identification device is adapted to receive input information through at least one of a key pad, a touch sensitive pad, a mouse pad, a roller ball, a switch, a button, a dial, a wireless connection, and combinations thereof.

37. The vehicle of claim 29, wherein the first radio frequency identification device is adapted to be at least one of activated and deactivated.

38. The vehicle of claim 29, wherein passage of the vehicle through the vehicle access zone incurs a fee charge.

* * * * *